R. E. HELLMUND.
SYSTEM OF CONTROL.
APPLICATION FILED DEC. 2, 1915.

1,320,050.

Patented Oct. 28, 1919.

WITNESSES:

INVENTOR
Rudolf E. Hellmund.
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,320,050.  Specification of Letters Patent.  Patented Oct. 28, 1919.

Application filed December 2, 1915. Serial No. 64,673.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control and especially to phase-regulating systems for polyphase induction motors and the like.

One object of my invention is to provide a system of the above-indicated character which shall be relatively simple in construction and effective and reliable in operation, and which shall be adapted to automatically effect a proper sequence of operations for preventing damage to the apparatus under emergency conditions, such as the resumption of supply-circuit voltage after a temporary interruption thereof.

Another object of my invention is to provide a system wherein polyphase induction motors are operated from a single-phase supply circuit through the medium of a phase-converting dynamo-electric machine, wherewith is associated suitable phase-advancing means, a minimum number of switches being employed in the system.

A further object of my invention is to provide a novel system of the type employing a phase-converting dynamo-electric machine that is provided with direct-current excitation for phase-advancing purposes, whereby, under the above-mentioned emergency conditions, the direct-current excitation of the phase-converting machine becomes effective or the induction motor to be regulated is connected to the supply circuit, or both, only after the phase-converting machine has reached synchronous speed, and full voltage obtains in both its primary and its secondary phase windings.

Another object of my invention is to provide a simple and novel means for regulating the effect of the above-mentioned phase-advancing means in accordance with the load conditions of the phase-converting machine.

Still another object of my invention is to provide simple and effective means for preventing injury to the direct-current exciting circuit referred to above, by reason of alternating-current voltages being induced in the circuit, for example.

Figure 1:
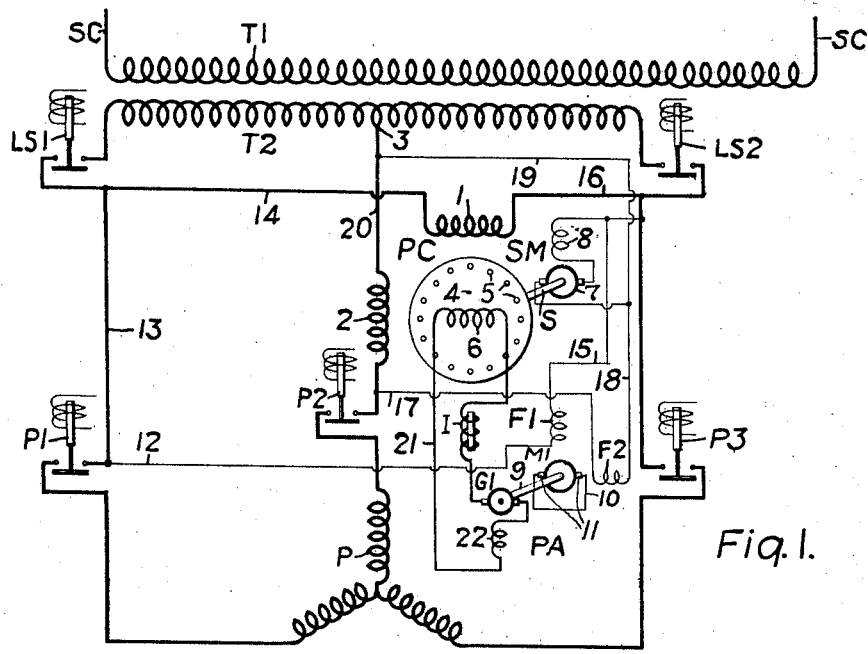
Figure 2:
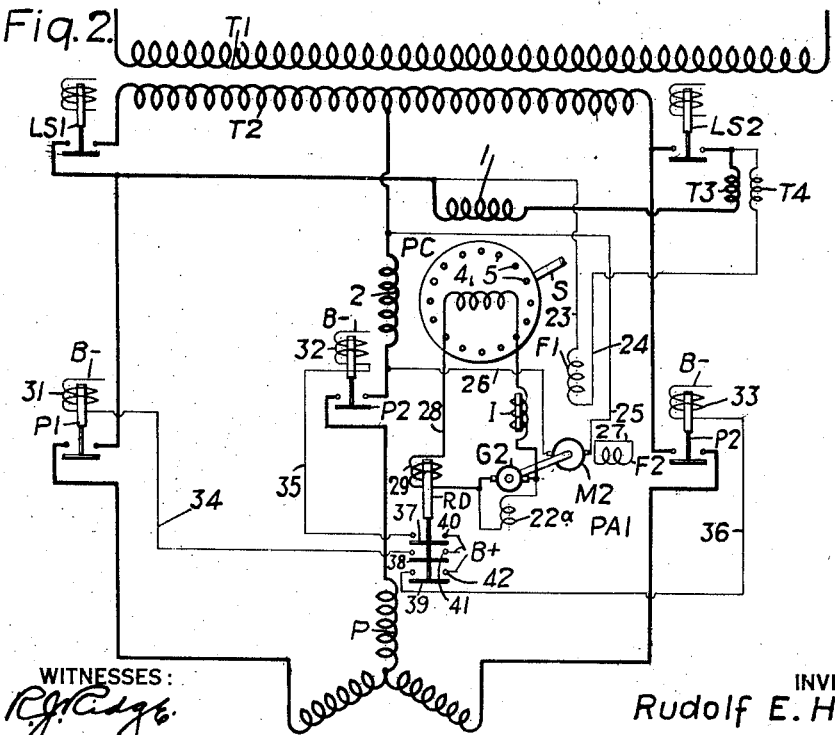

In the accompanying drawing, Figure 1 is a diagrammatic view of the main circuits of a system of control embodying my invention, and Fig. 2 is a similar view of a modified form of my invention.

Referring to Fig. 1 of the drawing, the system shown comprises a suitable supply-circuit transformer that is provided with a primary winding T1 which is directly connected to a suitable single-phase supply circuit SC, and a secondary winding T2; a polyphase induction motor, only the primary winding P of which is here shown, that is adapted for propelling electric railway vehicles or for similar purposes; a phase-converting dynamo-electric machine PC for supplying polyphase energy, in conjunction with the supply-circuit transformer, to the primary winding P of the induction motor from the single-phase supply circuit SC; a suitable starting motor SM for the phase-converting machine PC; direct-current exciting means PA that is associated with the phase-converting dynamo-electric machine for the well-known purpose of regulating power-factor conditions in the induction motor; a suitable inductive device I that is associated with the direct-current-exciting means and the phase-converting machine in a manner to be described; a plurality of suitable switching devices LS1 and LS2 for connecting the secondary transformer winding T2 to the control system as a whole; and a plurality of similar switches P1, P2 and P3 for connecting the respective phases of the primary winding P of the induction motor to the transformer winding T2.

The phase-converting machine PC comprises a plurality of quadrature-related primary and tertiary stationary phase windings 1 and 2, the former being directly connected across the transformer winding T2 and the latter being connected between the substantial mid-point 3 of the transformer winding T2 and the switch P2. The phase-converting machine also comprises a rotor 4 that is provided with a suitable squirrel-cage secondary winding 5 and a direct-current exciting or magnetizing winding 6.

The transformer winding T2 is adapted to deliver a voltage substantially equal to 86.6% of the supply-circuit voltage that is impressed upon the primary transformer winding T1, and the primary phase windings of the induction motor are respectively connected to the outer terminals of the transformer winding T2 and to the midpoint 3 thereof through the tertiary phase winding of the phase-converting machine PC. The operation of the phase-converting machine may be briefly set forth as follows: The primary phase winding 1 of the machine is excited from the transformer winding T2, and the machine is then brought up to synchronous speed by means of the starting motor SM. When synchronous speed conditions have been attained, the voltage of the tertiary phase winding 2 reaches its full value and, consequently, upon the closure of switches P1, P2 and P3, a balanced three-phase voltage is supplied to the primary winding P of the induction motor. The operation of the phase-converting machine with respect to the conversion of single-phase supply-circuit energy to three-phase energy for the propulsion of an induction motor is shown and described in U. S. Patent No. 629,898.

The driving motor DM for the phase-converting machine may be of any suitable type and is here shown as comprising an armature 7 that is mechanically associated with the rotor 4 by means of a shaft $s$, and a field-magnet winding 8 that is connected in series relation with the armature winding 7. The driving motor DM is connected intermediate the mid-point 3 of the transformer winding T2 and the switch LS2, whereby a voltage substantially equal to one-half of the secondary transformer voltage is applied to the driving motor. It will be understood, however, that any other suitable driving motor or system of connections therefor may be employed, if desired.

The direct-current-exciting means PA comprises a driving motor armature M1 that is mechanically associated with a generator armature winding G1, by means of a shaft 9, for example. A conductor 10 serves to directly connect the brushes 11 of the armature M1, and the driving motor is thus of the repulsion type. A main or exciting field winding F1 for the driving motor of the direct-current-exciting means has one terminal connected through conductors 12, 13, and 14 to one terminal of the primary phase winding 1 of the phase-converting machine PC, while the other terminal of the field winding F1 is connected through conductors 15 and 16 to the other terminal of the phase winding 1. A suitable compensating or transformer field winding F2 for the armature M1 is connected in parallel relation to the secondary phase winding 2 of the phase-converting machine through conductor 17 which is connected to one terminal of the field winding F2, and conductors 18, 19 and 20 which are connected to the other terminal thereof.

The generator armature winding G1 of the direct-current-exciting means is connected through the inductive device I, which may comprise an induction coil or any other suitable highly inductive apparatus, the direct-current magnetizing winding 6 of the rotor 4, conductor 21 and a series field-magnet winding 22 which is connected to the opposite terminal of the armature winding G.

The direct-current excitation of the phase-converting machine PC serves to effect power-factor regulation of the induction motor, in a manner familiar to those skilled in the art, and no further exposition thereof is believed to be necessary.

It will be observed that inasmuch as the driving motor of the direct-current-exciting means is of the repulsion type, it receives energy inductively from the transformer field winding F2 which is connected in parallel relation to the tertiary phase winding 2 of the phase-converting machine. Consequently, the voltage of the armature M1 is not built up and the direct-current-exciting means is inoperative whenever full-voltage conditions do not obtain in the phase winding 2.

One advantage of the system described resides in the fact that the auxiliary exciter apparatus does not require any automatic switching devices under emergency conditions such as the resumption of supply-circuit energy after a temporary interruption thereof. Assuming that, for any reason, the supply circuit-voltage is temporarily interrupted, the various main-circuit switches will not open inasmuch as they are preferably energized from an auxiliary battery circuit, for example, but the voltages of the primary and tertiary phase windings 1 and 2 are reduced to zero, and also the driving motor DM is deënergized and the driving motor of the direct-current-exciting means is likewise deënergized. Consequently, the direct-current-exciting means rapidly approaches standstill conditions, and, in any case, the direct-current excitation of the rotor 4 is materially reduced and, of course, dies out entirely if the direct-current-exciting means PA comes to a stop. Upon the subsequent resumption of the supply-circuit voltage, the phase-converting machine PC will first be brought up to speed by the reënergization of the driving motor DM; but the driving motor of the direct-current-exciting means will not be fully energized until the voltage of the phase winding 2 of the phase-converting machine reaches its full value which occurs only after the phase-converting machine has reached substantially synchronous speed, as is well known. The armature voltage of the repulsion motor of the direct-current-exciting means will then be built up, and the magnetizing winding 6 of the rotor 4, will, consequently, be energized as the generator G1 reaches normal-speed conditions.

The function of the inductive device I is two-fold: First, it will prevent direct current from building up too quickly after the above-mentioned resumption of supply-circuit voltage, thereby permitting the rotor 4 of the phase-converting machine to gradually assume its proper magnetic position with respect to the primary field flux that is set up by the phase winding 1; secondly, the inductive device I prevents any double-frequency voltages which might be induced in the magnetizing winding 6 from sending relatively heavy alternating currents through the direct-current armature G1.

It will thus be seen that, in case of a resumption of supply-circuit voltage after a temporary interruption thereof, the direct-current excitation of the rotor 4 is prevented until the phase-converting machine has reached synchronous speed, and full-voltage conditions obtain in both the primary and tertiary phase windings 1 and 2, such results being obtained without requiring the use of any complicated switching arrangements.

Reference may now be had to Fig. 2, wherein the supply-circuit transformer, the phase-converting machine PC, the primary winding P of the induction motor and the various main-circuit switches are identical with those shown in Fig. 1, and, in addition, direct-current-exciting means PA1, a relay device RD, and an auxiliary transformer having primary and secondary windings T3 and T4, respectively, are provided.

The direct-current-exciting means PA1 comprises a motor armature M2 and a direct-current generator armature G2, a plurality of field-magnet windings F1 and F2 for the armature M2, and a shunt-connected field winding 22$^a$ for the generator armature G2. The terminals of the main or exciting field winding F1 for the auxiliary driving motor are connected through conductors 23 and 24 to one terminal of the primary phase winding 1 and to one terminal of the secondary auxiliary transformer winding T4, respectively. The phase winding 1 is connected through the primary winding T3 of the auxiliary transformer directly across the secondary supply-circuit transformer winding T2, whereby, in addition to the voltage of the phase winding 1 that is impressed upon the exciting field winding F1, an additional voltage that is proportional to the load current traversing the primary phase winding 1 is impressed upon the field-magnet winding F1 by means of the auxiliary transformer windings T3 and T4.

The motor armature winding M2 is connected through conductors 25 and 26 across the tertiary phase winding 2 of the phase-converting machine, while the compensating or transformer field winding F2 is short-circuited by a conductor 27. Consequently, the driving motor of the direct-current-exciting means PA1 is again dependent upon the attainment of full-voltage conditions in both of the phase windings 1 and 2 for operation and in order to effect direct-current excitation of the rotor 4.

The direct-current armature G2 is connected through the inductive device I, the magnetizing winding 6 of the rotor 4, conductor 28 and the actuating coil 29 of the relay device RD.

The device RD normally occupies its lower or open position to interrupt the circuits of the actuating coils 31, 32 and 33 of the switches P1, P2 and P3, respectively. When the actuating coil 29 of the relay device RD is energized by reason of the operation of the generator armature G2, the device is raised to its upper or closed position to complete the circuits of the actuating coils of the switches P1, P2 and P3, through conductors 34, 35 and 36 and movable auxiliary contact members 37, 38 and 39 of the relay device, respectively. The corresponding stationary contact members 40, 41 and 42 of the relay device are connected to a suitable source of energy, such as the positive terminal of a battery, as indicated by the character B+, while the free terminals of the actuating coils 31, 32 and 33 may be connected to the negative battery terminal in accordance with the designation B—.

Upon the resumption of supply-circuit voltage after a temporary interruption thereof, the operation of the system with respect to the direct-current excitation of the phase-converting machine PC is similar to that already set forth in connection with Fig. 1. In addition, the actuating coil 29 of the relay device RD is energized to close the controlling circuits of the switches P1, P2 and P3 only after the magnetizing winding 6 of the rotor 4 is fully energized.

It will be observed that, in the system just described, in addition to the prevention of direct-current excitation of the rotor 4, until the phase-converting machine PC has reached synchronous speed and full-voltage relations obtain in both the primary and tertiary phase windings 1 and 2, the connection of the primary winding P of the induction motor to the transformer winding T2 is automatically prevented until such conditions obtain; that is, until the magnetizable winding 6 of the rotor 4 is fully excited. Moreover, the excitation of the field-magnet winding F1 varies in accordance with the load conditions of the phase-converting machine by reason of the auxiliary transformer windings T3 and T4. Consequently, the speed of the driving armature M2 and the resultant output of the generator armature G2 varies inversely with the load changes of the phase-converting machine: For instance, an increase in the excitation of the field-magnet winding F1 effects a decrease in the speed of the armature A2 and in the voltage delivered by the generator armature winding G2. In this way, the effect of the direct-current exciting means PA1 is varied in such manner as to properly regulate power-factor conditions in the induction motor, as explained in the following paragraph.

In systems of the type illustrated, a relatively weak excitation of the magnetizing winding 6 is required under normal or full-load conditions, while a relatively heavy excitation thereof is necessary when the induction motor is operating under light-load conditions; also, when a relatively low resistance is included in the secondary circuit (not shown) of the induction motor, accompanied by relatively low secondary frequency, a light excitation for the magnetizing winding is required, while, in case a relatively heavy resistance is connected in the secondary circuit accompanied by relatively high secondary frequency, a correspondingly heavy direct-current excitation is necessary. For intermediate loads or secondary frequencies, it will be understood that the direct-current excitation of the magnetizing winding 6 should vary proportionately, in accordance with the principles mentioned.

I do not wish to be restricted to the specific circuit connections or arrangement and location of parts herein set forth, as various modifications thereof may be made without departing from the spirit and scope of my invention. I desire, therefore, that only such limitations shall be imposed as are indicated in the appended claims.

I claim as my invention.

1. In a phase-converter system, the combination with a source of single-phase alternating current, of a phase-converting machine provided with fixed primary and tertiary windings and a movable secondary winding, connections from said source to said primary winding, an exciter machine connected to supply direct-current excitation to said secondary winding, and means whereby said exciter machine is energized only as an electromotive force is induced in said tertiary winding, whereby substantially no direct-current excitation is supplied to said secondary winding except when a predetermined electromotive force is induced in said tertiary winding.

2. In a phase-converter system, the combination with a source of single-phase alternating-current, of a phase-converting machine provided with fixed primary and tertiary windings and a movable secondary winding, connections from said source to said primary winding, an exciter machine connected to supply direct-current excitation to said secondary winding, means whereby said exciter machine is energized only as an electromotive force is induced in said tertiary winding, whereby substantially no direct-current excitation is supplied to said secondary winding except when a predetermined electromotive force is induced in said tertiary winding, a load circuit, and means whereby said load circuit is connected to said phase-converter system only when said direct exciting current is flowing.

3. The combination with a phase-converting dynamo-electric machine comprising quadrature-related primary and tertiary windings and a secondary aggregate arranged for relative movement with respect thereto, of a source of alternating current connected to said primary winding, exciting means for producing a unidirectional field in said secondary aggregate for causing synchronous operation thereof with respect to the primary field, and means maintaining said exciting means inactive except during the production of an electromotive force of more than a predetermined magnitude in said tertiary winding.

4. The combination with a phase-converting dynamo-electric machine comprising quadrature-related primary and tertiary windings and a secondary aggregate arranged for relative movement with respect thereto, of a source of alternating current connected to said primary winding, exciting means for producing a unidirectional field in said secondary aggregate for causing synchronous operation thereof with respect to the primary field, and means for energizing said exciting means from said tertiary winding, whereby said exciting means is inactive except during the production of an electromotive force of more than a predetermined magnitude in said tertiary winding.

5. The combination with a phase-converting dynamo-electric machine comprising quadrature-related primary and tertiary windings and a secondary aggregate arranged for relative movement with respect thereto, of a source of alternating current connected to said primary winding, an auxiliary direct-current generator connected to energize an exciting winding in said secondary aggregate for causing synchronous operation thereof with respect to the primary field, a driving motor for said generator, and means for energizing said motor from said tertiary winding, whereby said generator produces an exciting electromotive force only when said tertiary winding is the seat of an electromotive force of more than a predetermined magnitude.

6. In a phase-converting system, a single-phase supply circuit, a polyphase load circuit, a phase-converting machine of the dynamo-electric type, said machine embodying quadrature-related primary and tertiary windings and a secondary aggregate arranged for relative movement with respect thereto, connections from said supply circuit to said primary winding, switching means for connecting said converter to said load circuit, and means for closing said switching means upon the attainment of a predetermined minimum voltage in said tertiary winding.

7. In a phase-converting system, a single-phase supply circuit, a polyphase load circuit, a phase-converting machine of the dynamo-electric type, said machine embodying quadrature-related primary and tertiary windings and a secondary aggregate arranged for relative movement with respect thereto, connections from said supply circuit to said primary winding, switching means for connecting said converter to said load circuit, and means for closing said switching means when said secondary aggregate is moving at synchronous speed with respect to the field of said primary winding.

8. In a phase-converting system, a single-phase supply circuit, a polyphase load circuit, a phase-converting machine of the dynamo-electric type, said machine embodying quadrature related primary and tertiary windings, and a secondary aggregate arranged for relative movement with respect thereto, connections from said supply circuit to said primary winding, means for supplying unidirectional exciting current to said secondary aggregate for the operation thereof at synchronous speed with respect to the primary field, switching means for connecting said converter to said load circuit and means for closing said switching means upon the flow of said exciting current.

9. In a phase-converting system, a single-phase supply circuit, a polyphase load circuit, a phase-converting machine of the dynamo-electric type, said machine embodying quadrature related primary and tertiary windings and a secondary aggregate arranged for relative movement with respect thereto, connections from said supply circuit to said primary winding, means for supplying unidirectional exciting current to said secondary aggregate for the operation thereof at synchronous speed with respect to the primary field, means for energizing said exciting means only upon the attainment of a predetermined minimum electromotive force in said tertiary winding, switching means for connecting said converter to said load circuit, and means for closing said switching means upon the flow of said exciting current.

10. In a phase-converting system, a single-phase supply circuit, a polyphase load circuit, a phase-converting machine of the dynamo-electric type, said machine embodying quadrature related primary and tertiary windings and a secondary aggregate arranged for relative movement with respect thereto, connections from said supply circuit to said primary winding, an auxiliary exciting generator connected to supply unidirectional exciting current to said secondary aggregate for the synchronous operation thereof with respect to the field of said primary winding, means for energizing said generator from said tertiary winding, switching means for connecting said converter to said load circuit, and means for closing said switching means upon the flow of said exciting current.

11. In a phase-converting system, a single-phase supply circuit, a polyphase load circuit, a phase-converting machine of the dynamo-electric type, said machine embodying quadrature related primary and tertiary windings and a secondary aggregate arranged for relative movement with respect thereto, connections from said supply circuit to said primary winding, an auxiliary exciting generator connected to supply unidirectional exciting current to said secondary aggregate for the synchronous operation thereof with respect to the field of said primary winding, a driving motor for said auxiliary generator, connections from said tertiary winding to said motor for the energization thereof, whereby said auxiliary generator is not energized except upon the attainment of a predetermined minimum electromotive force in said tertiary winding, switching means for connecting said converter to said load circuit and means for closing said switching means upon the flow of said exciting current.

In testimony whereof, I have hereunto subscribed my name this 29th day of Nov. 1915.

RUDOLF E. HELLMUND.

Copies of this patent may be obtained for five cents each, by addressing the "Commissioner of Patents, Washington, D. C."